US011283941B2

(12) United States Patent
Nakahara

(10) Patent No.: US 11,283,941 B2
(45) Date of Patent: Mar. 22, 2022

(54) NETWORK DEVICE THAT DETECTS AN EVENT, METHOD FOR CONTROLLING NETWORK DEVICE, AND RECORDING MEDIUM

(71) Applicant: CANON KABUSHIKI KAISHA, Tokyo (JP)

(72) Inventor: Hidetaka Nakahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/017,067

(22) Filed: Sep. 10, 2020

(65) Prior Publication Data
US 2021/0092239 A1 Mar. 25, 2021

(30) Foreign Application Priority Data

Sep. 20, 2019 (JP) .............................. JP2019-172001

(51) Int. Cl.
H04N 1/00 (2006.01)
(52) U.S. Cl.
CPC ..... H04N 1/00244 (2013.01); H04N 1/00037 (2013.01)
(58) Field of Classification Search
CPC ....................... H04N 1/00244; H04N 1/00037
See application file for complete search history.

(56) References Cited

U.S. PATENT DOCUMENTS

2007/0115108 A1* 5/2007 Martin ................... H04M 11/04
340/506
2016/0219167 A1* 7/2016 Kaneko .............. H04N 1/00244
2018/0097968 A1* 4/2018 Sato ................... H04N 1/32765

FOREIGN PATENT DOCUMENTS

JP 2012064045 A 3/2012

* cited by examiner

Primary Examiner — Juan M Guillermety
(74) Attorney, Agent, or Firm — Rossi, Kimms & McDowell LLP

(57) ABSTRACT

A network device including a detection unit that detects an event includes a communication setting managing unit that manages notification settings; an event collecting unit that, in the case in which notification information linked to the event detected by the detection unit is present, determines whether or not each of the details of the notification information is a notification target in accordance with the notification settings and generates a message for each of the details that are notification targets by assigning attribute information linked to the detail or the event; and an event transmitting unit that transmits the generated one or more messages to a management server, and, in the case in which it is determined that a plurality of details corresponding to the notification information linked to the detected event are determined to be the notification targets in accordance with the notification settings, information that can be used for uniquely identifying the event as a part of the attribute information is assigned to each of the plurality of messages generated for each detail.

7 Claims, 8 Drawing Sheets

NETWORK DEVICE THAT DETECTS AN EVENT, METHOD FOR CONTROLLING NETWORK DEVICE, AND RECORDING MEDIUM

FIELD OF THE INVENTION

The present invention relates to a network device, a method for controlling a network device, and a recording medium.

DESCRIPTION OF THE RELATED ART

Systems that acquire various event logs transmitted from a device in various services on a server or a cloud and store the event logs for performing prompt maintenance, prediction of malfunctions and a lifespan, enhancement of installed functions, and the like in accordance with the state of the device are known. The server performs countermeasures such as an analysis of various changes of state in a device, prompt notification of need for replacement of consumables and arrangements for maintenance operations according to events that have occurred, and the like by using the accumulated event logs and applications on the server. In order for a server to perform prompt processing, it is necessary to transmit an event log, which represents events that have occurred in the device, in a form that can be easily handled by an application of the server, from the device.

However, when an event log is configured in a form that can be easily handled by an application of the server, the amount of information may be too large, and there is concern that the processing load on the device or the communication load on a network may be too high. For this reason, it is necessary to reduce the processing load on the device by reducing the amount of information by not transmitting unnecessary information or the like. Japanese Patent Laid-open No. 2012-064045 discloses an error output program that puts a plurality of errors that have occurred inside a device into one piece of notification information.

However, in the program disclosed in Japanese Patent Laid-open No. 2012-064045, although the frequency of communication and the amount of data can be reduced by grouping the errors without transmitting an error every time an error has occurred in the device, the degree of easiness in handling information in an output destination then deteriorates. For this reason, there is a demand to lower the processing load on a device with the degree of ease in handling of information in a server being taken into account.

SUMMARY OF THE INVENTION

The present invention reduces the processing load on a device while transmitting an event detected inside the device in a form that can be easily used by a service on a server.

A network device according to the present invention is a network device that includes a detection unit detecting an event including: a management unit that manages notification settings; a determination unit that, in the case in which notification information linked to the event detected by the detection unit is present, determines whether or not each of the details of the notification information is a notification target in accordance with the notification settings; a generation unit that generates a message for each of the details that are notification targets by assigning attribute information linked to the details or the event; and a transmission unit that transmits the generated one or more messages to a management server, and, in the case in which a plurality of details corresponding to the notification information linked to the detected event are determined to be notification targets in accordance with the notification settings, information that can be used for uniquely identifying the event as a part of the attribute information is assigned to each of the plurality of messages generated for each detail.

Further features of the present invention will become apparent from the following description of exemplary embodiments with reference to the attached drawings.

DESCRIPTION OF THE EMBODIMENTS

Figure 1:
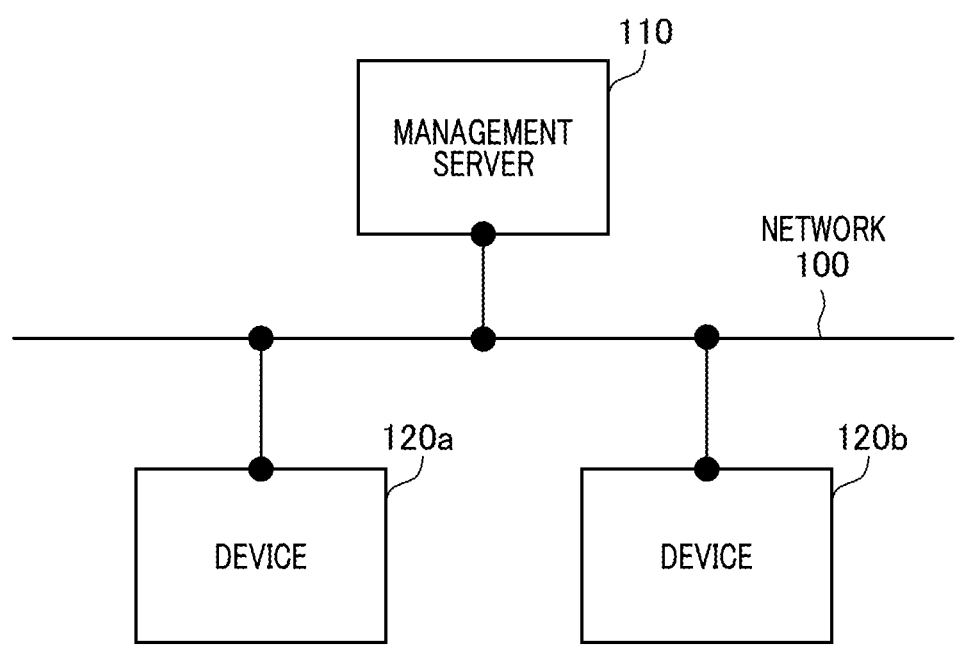
FIG. 1 is a diagram illustrating the configuration of the entire management system.

FIG. 1 is a diagram illustrating the configuration of the entire management system according to this embodiment. The management system includes a management server 110 and manages devices 120 (devices 120a and 120b) that are connected to the management server 110 through a network 100. The network 100, for example, is a so-called communication network that is realized by any one of a LAN such as the Internet, a WAN, a telephone line, a dedicated digital line, a cable TV line, and a data broadcast radio circuit, and the like or a combination thereof.

The device 120 is a network device that has a communication function for notifying the management server 110 of an event inside the device in the form of a history event. In this embodiment, as one example of the device 120, a multifunction device realizing a plurality of kinds of function such as copying, a facsimile, and the like will be described. The device 120 notifies the management server 110 of a history of transitions or returns to a power saving state and a history of transitions and returns to an abnormal state such as occurrence of an error and the like in addition to a history of execution of functions as a multifunction device. In this embodiment, although the multifunction device will be described as one example of the device 120, the device 120 is not limited thereto. The device 120 may have a function of detecting an event inside the device such as an error and transmitting detected information to the management server 110.

The management server 110 stores information of events notified from the device 120 in a storage inside the management server. In addition, the management server 110 is used for an analysis of an operating status of the device 120 and the like using the information accumulated in the storage. The management server 110 may be realized by a virtual machine (cloud service) using resources provided by a data center including a server apparatus other than the server apparatus or may be realized by an application.

Figure 2:
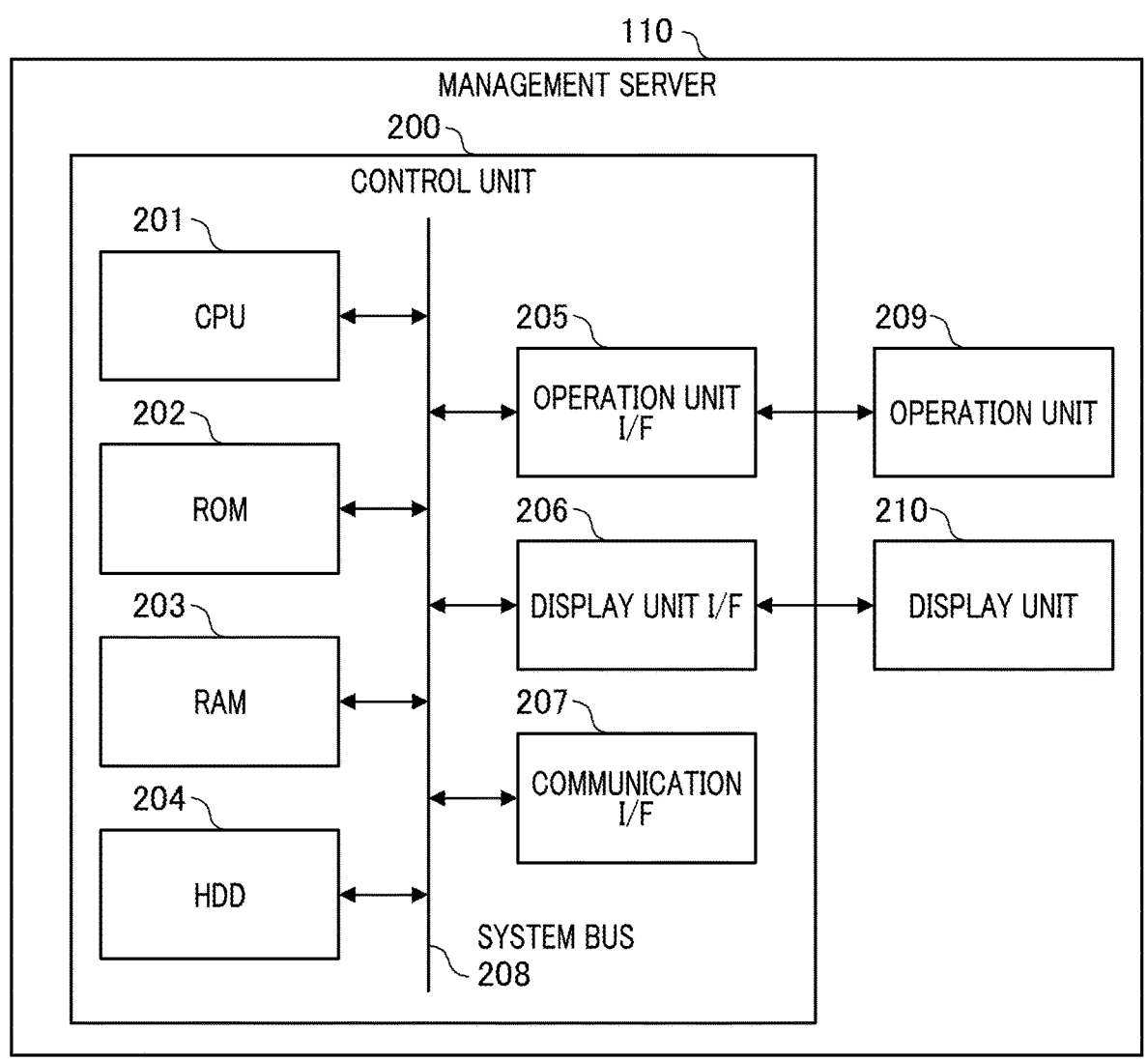
FIG. 2 is a diagram illustrating the configuration of a management server.

FIG. 2 is a diagram illustrating the configuration of the management server 110. The management server 110, for example, is realized by an information processing apparatus and includes a control unit 200, an operation unit 209, and a display unit 210. The control unit 200 includes a central processing unit (CPU) 201 and performs overall control of the management server 110. In addition, the control unit 200 includes a read only memory (ROM) 202, a random access memory (RAM) 203, a hard disk drive (HDD) 204, an operation unit I/F 205, a display unit I/F 206, and a communication I/F 207. These components are interconnected using a system bus 208.

The CPU 201 starts an operating system (OS) using a boot program stored in the ROM 202. In addition, the CPU 201 executes various processes by executing an application program stored in the HDD 204 on the OS. The RAM 203 is used as a temporary work area of the CPU 201. The HDD 204 stores data such as application programs, settings of applications, a history received from the device 120, and the like.

The operation unit 209 includes a pointing device (for example, a mouse, a touch pad, a touch panel, a track ball, or the like), a keyboard, and the like and accepts an operation from a user. The operation unit I/F 205 is an interface with the operation unit 209 and transmits information input by a user using the operation unit 209 to the CPU 201. The display unit 210 includes a display and displays various kinds of information to a user. The display unit I/F 206 outputs data to be displayed in the display unit 210 to the display unit 210. The communication I/F 207 is connected to the network 100 and inputs/outputs information to/from the device 120 through the network 100.

Figure 3:
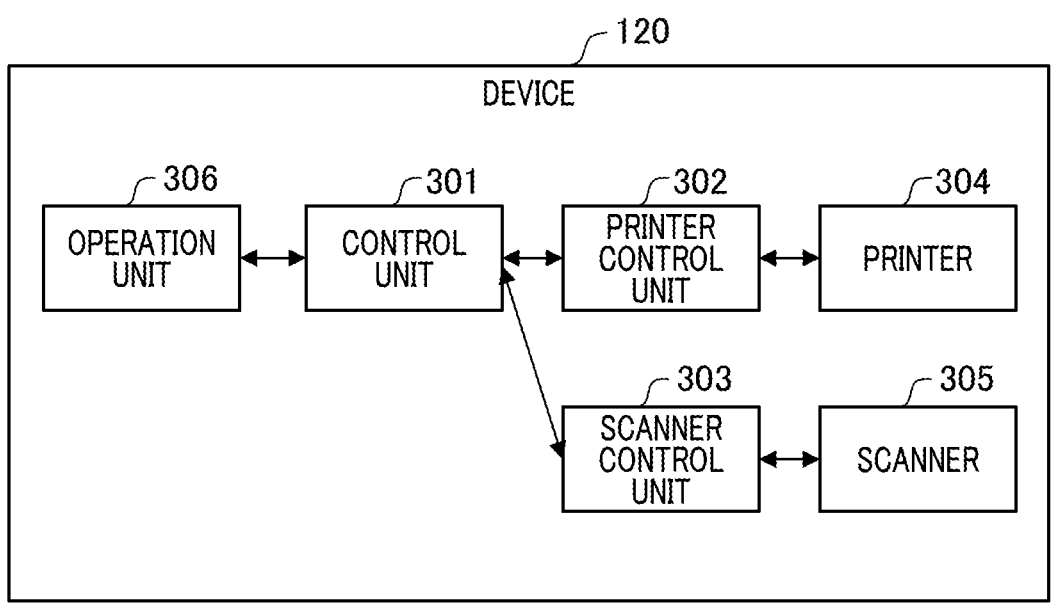
FIG. 3 is a diagram illustrating the configuration of a device.

FIG. 3 is a diagram illustrating the configuration of the device 120. The device 120 according to this embodiment is a multifunction device and includes a control unit 301, a printer control unit 302, a scanner control unit 303, a printer 304, a scanner 305, and an operation unit 306. The control unit 301 performs overall control of the device 120. The control unit 301 is connected to the operation unit 306, the printer control unit 302, and the scanner control unit 305. Details of the control unit 301 will be described later with reference to FIG. 4.

The printer 304 is an image output device that forms an image corresponding to a received print job and outputs the formed image on a sheet or optically reads a document image set in the scanner and outputs the read document image to a sheet. The printer 304 is connected to the printer control unit 302 and is controlled by the printer control unit 302. The scanner 305 is an image input device that optically reads a document image set in the scanner and generates image data. The scanner 305 is connected to the scanner control unit 303 and is controlled by the scanner control unit 303.

The operation unit 306 includes a display device such as an LCD (liquid crystal display device) and displays information such as operation details, various settings, and the like relating to the device 120. The display device of the operation unit 306 can be operated as a touch panel and accepts a user's operation. In addition, the operation unit 306 may additionally include a button board that accepts a user's operation.

Figure 4:
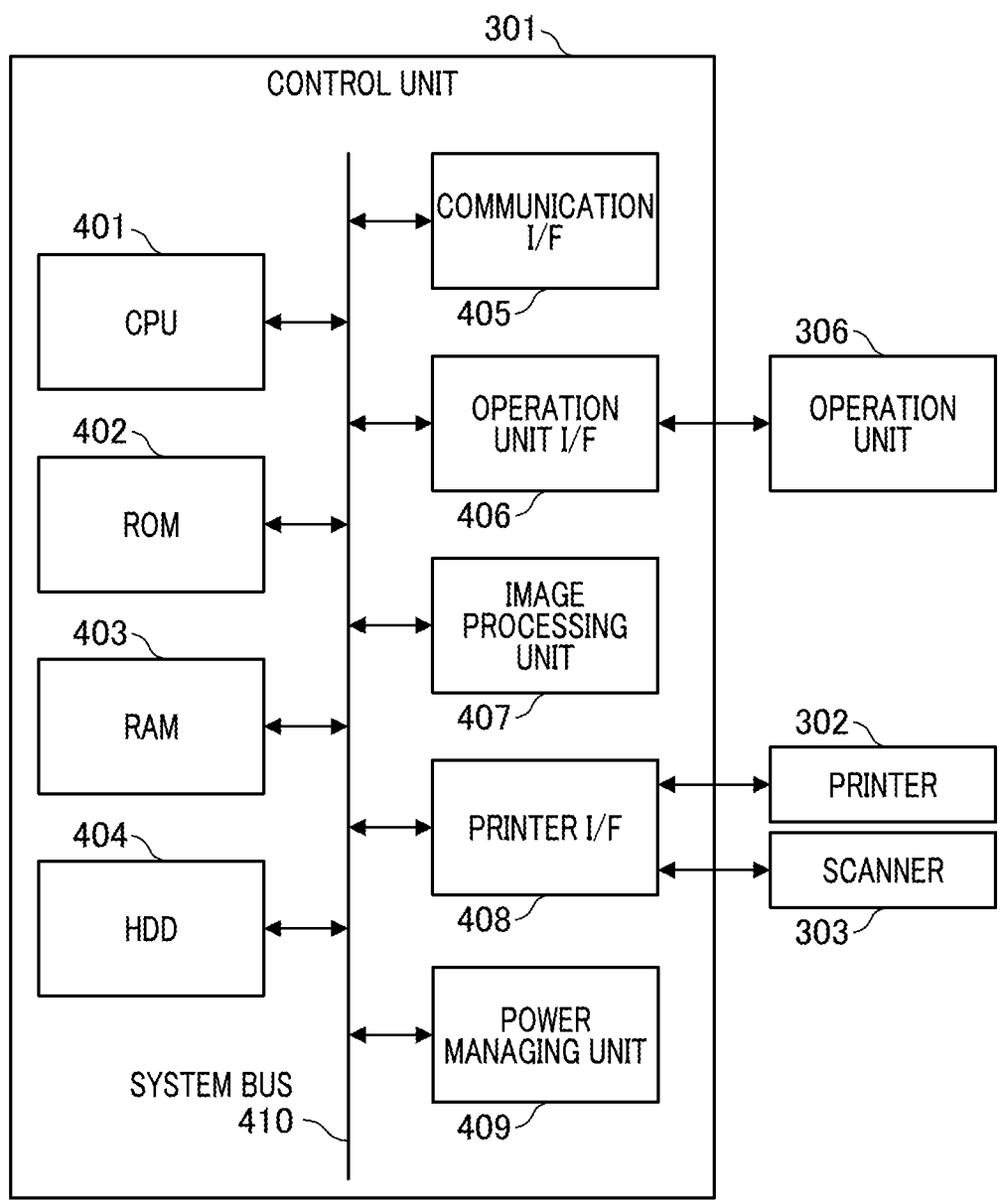
FIG. 4 is a diagram illustrating the configuration of a control unit of the device.

FIG. 4 is a diagram illustrating the configuration of the control unit 301 of the device 120. The control unit 301 includes a CPU 401 and performs overall control of the device 120. In addition, the control unit 301 includes a ROM 402, a RAM 403, an HDD 404, a communication I/F 405, an operation unit I/F 406, an image processing unit 407, a printer I/F 408, and a power managing unit 409. These components are interconnected through a system bus 410.

The CPU 401 starts an OS using a boot program stored in the ROM 402. In addition, the CPU 201 executes various processes by executing an application program stored in the HDD 404 on the OS. The RAM 403 is used as a temporary work area of the CPU 401 and is also used as an image memory area for temporarily storing image data. The HDD 404 stores data such as application programs, image data, various setting values, a history inside the device 120, and the like.

The operation unit I/F 406 is an interface with the operation unit 306 and outputs image data to be displayed in the operation unit 306 to the operation unit 306. In addition, the operation unit I/F 406 transmits information input by a user using the operation unit 306 to the CPU 401. The printer control unit 302 and the scanner control unit 303 are connected to the printer I/F 408, and the printer I/F 408 performs conversion of image data between a synchronous system/an asynchronous system.

The communication I/F 405 is connected to the network 100 and inputs/outputs information to/from the management server 110 through the network 100. The image processing unit 407 performs output image processing for the printer 304 and processing of image rotation, image compression, resolution conversion, color space conversion, gray scale conversion, and the like for an input image from the scanner 305. The power control unit 409 performs overall power control of the device 120. For example, the power control unit 409 controls a transition to a power saving state other than a normal power conduction state, return to a normal state, and the like in addition to the control of power on/off.

Figure 5:
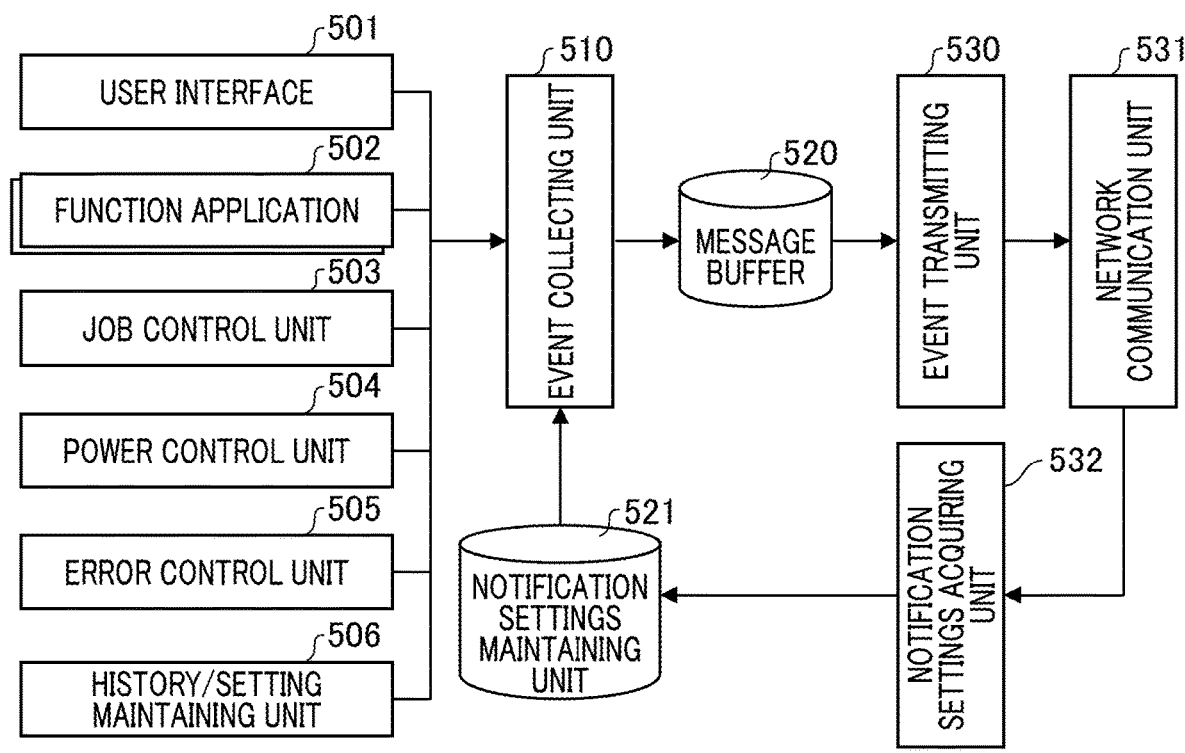
FIG. 5 is a diagram illustrating the configuration of software of the device 120.

FIG. 5 is a diagram illustrating the configuration of software of the device 120. The function of each unit is realized by the CPU 401 executing a program or the like stored in one storage unit of the RAM 403, the HDD 404, and the ROM 402. In this embodiment, the device 120 is a multifunction device, and software realizing various functions using a network and a memory storage in addition to scanning and printing operates in the device 120.

The device 120 includes a user interface 501, a function application 502, a job control unit 503, a power control unit 504, an error control unit 505, a history settings maintaining unit 506, and an event collecting unit 510. In addition, the device 120 additionally includes a message buffer 520, an event transmitting unit 530, a network communication unit 531, a notification settings acquiring unit 532, and a notification settings maintaining unit 521.

The user interface 501 provides a user interface function of displaying a screen on which the operation unit 306 is operated by a user and delivering an operation accepted from the user to the CPU 401. The function application 502 is an application that provides various functions of the multifunction device such as copying, printing, mail transmission, and the like, and the device 120 includes a plurality of applications. The function application 502 operates an application function of the multifunction device by being triggered upon a user's instruction made through the operation unit 306, reception of data through the communication I/F 405, and the like.

The job control unit receives an instruction from the function application 502, controls the printer 302 or the scanner 303, and executes scanning or printing. The power control unit 504 controls the power managing unit 409 in association with the state of the software inside the device 120 and controls a transition between the normal power conduction state and the power saving state.

The error control unit 505 receives a notification of an abnormal state that has occurred in the device 120 such as the job control unit 503, the printer control unit 302, the scanner control unit 303, or the like and performs control such as stopping the whole or a part of the device 120, instructing regarding a retracting operation, and the like.

The history settings maintaining unit 506 manages information inside the device 120. For example, the history settings maintaining unit 506 maintains settings required for controlling the device 120 and a job. In addition, the history settings maintaining unit 506 maintains a user's operation history, execution results of jobs, a history of errors, log information that is saved for the purpose of analysis and debugging when a fault occurs in the system, and the like. The data maintained by the history settings maintaining unit 506 is stored in the HDD 404.

The event collecting unit 510 monitors a state transition of each module (the user interface 501 to the history settings maintaining unit 506) inside the device 120 and detects an event. Then, the event collecting unit 510 determines whether or not the detected event is a target to be notified in accordance with notification settings to be described below. Thereafter, in order to transmit the state transition inside the device 120 to the management server 110, the event collecting unit 510 normalizes the event that is target to be notified and stores the normalized event in the message buffer 520. For the normalization, for example, a general-purpose format such as a JavaScript Object Notation (JSON) is used.

The event collecting unit 510 generates a message to which various kinds of attribute information are additionally assigned in accordance with the type of event in addition to basic information such as an event name, an occurrence time, a serial number of an information processing apparatus, and the like at the time of normalization. The attribute information is given by the event collecting unit 510 referring to non-volatile information such as the history settings maintaining unit 506 or dynamically acquiring it from each module state and the like. The event normalized by the event collecting unit 510 is stored in the message buffer 520 as a message. The message buffer 520 is in a non-volatile area disposed inside the HDD 404.

The event transmitting unit 530 notifies the management server 110 of an event that has occurred in the device 120 through the network communication unit 531. The event transmitting unit 530, for example, detects that an event has been issued by detecting writing of a message in the message buffer 520. Then, the event transmitting unit 530 reads messages from the message buffer 520 and transmits one or more messages to the management server 110, thereby notifying of the event. The network communication unit 531 communicates with the management server 110 using a network 405.

The notification settings acquiring unit 532 acquires notification settings of an event from the management server 110 through the network communication unit 531 and stores the acquired notification settings in the notification settings maintaining unit 521. The notification settings acquiring unit 532 and the notification settings maintaining unit 521 function as management units for notification settings of events. The notification settings maintaining unit 521 stores notification settings of events on the HDD 404 in the form of a file. The notification settings of events stored in the notification settings maintaining unit 521 represent details indicating certain events among events, which have occurred inside the device 120 and can be formed as events, that are to be notified to the server 110. The event collecting unit 510 operates to normalize only events that are designated to be notified to the server 110 among detected events in accordance with notification settings of events stored by the notification settings maintaining unit 521 and stores the normalized events in the message buffer 520.

Next, notification settings of events stored in the notification settings maintaining unit 521 will be described. Table 1 represents a relation between notification settings and an event.

TABLE 1

| Collection | Event | Description |
|---|---|---|
| Power | DevicePowerOn | Turn on power of device |
|  | DeviceSleepStarted | Transition to sleeping of device |
|  | DeviceSleepReverted | Return from sleep of device |
|  | DevicePowerOff | Turn off power of device |
| Counter | CounterSnapshotted | List of billing counter |
|  | PartsCounterSnapshotted | List of parts counter |
| Alarm | ErrorOccurred | Occurrence of error |
|  | AlarmOccurred | Occurrence of alarm |
| Information | TonerBottleInstalled | Installation of toner bottle |
|  | TonerBottleRemoved | Removal of toner bottle |
|  | TonerBottleEmptied | Toner bottle being empty |
| Job | JobStarted | Input job |
|  | JobCompleted | Completion of execution of job |
|  | JobExecuting | Start execution of job |
| Diagnosis | DiagnosisCompleted | Completion of self-diagnosis |
|  | LifePredictionInitialized | Initialization of part life information |
|  | LifePredictionThresholdReached | Reaching part life |
|  | LifePredictionDiscontinued | Stop calculation of part life |

"Event" represented in Table 1 is an example of an event occurring on the device 120 that is a multifunction device and is a unit normalized by attaching a name to each transition in the state that has occurred inside the device 120. In other words, Event is a unit in which an event is written into the message buffer 520 by the event collecting unit 530 and is a unit in which an event is transmitted to the management server 110. "Description" represented in Table 1 is a description of each event. For example, "JobStarted" is an event indicating that a job such as copying, printing, or the like has started to be executed, and "ErrorOccurred" is an event indicating that a certain abnormal state has occurred inside the device 120.

"Collection" represented in Table 1 is a unit in which a plurality of events are configured as a group of meanings of operations. The notification settings maintaining unit 521 maintains a collection file in which notification settings indicating whether or not an event is to be notified to the management server 110 are formed in units of Collections. For example, when Collection "Alarm" is designated as a notification target, Events "ErrorOccurred" and "AlarmOccurred" are notification targets to be transmitted to the management server 110. When Collection "Counter" is designated, Events "CounterSnapshotted" and "PartsCounterSnapshotted" are notification targets for the management server 110. "CounterSnapshotted" is an event of acquisition of counter information for billing, and "PartsCounterSnapshotted" is an event of acquisition of information of a wear counter of a part. In addition, Event "snapshot" is an event that is regularly transmitted in accordance with start of the operation of the device 120, a timer, or the like without being triggered upon a state transition.

Figure 6A:
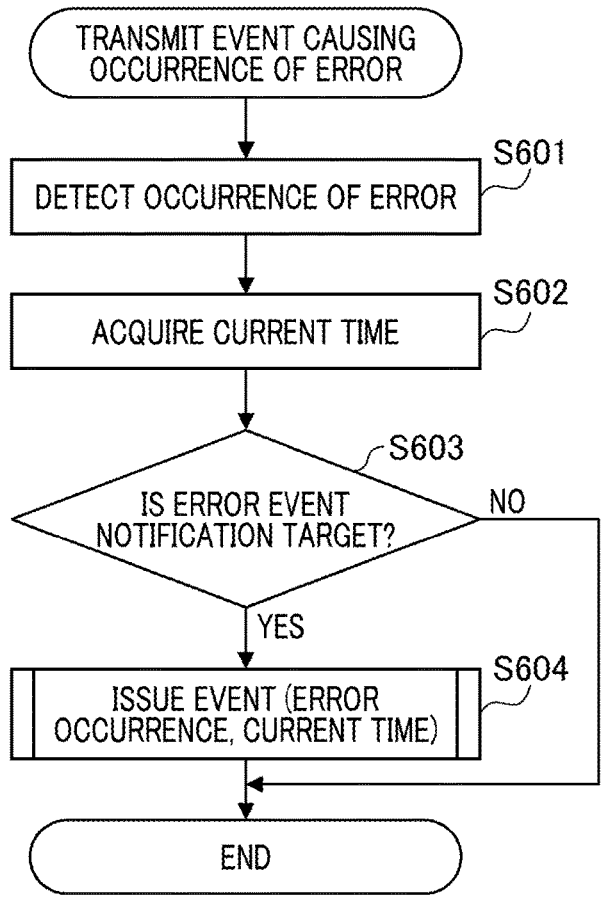
FIGS. 6A and 6B are flowcharts illustrating an event transmitting process.
Figure 6B:
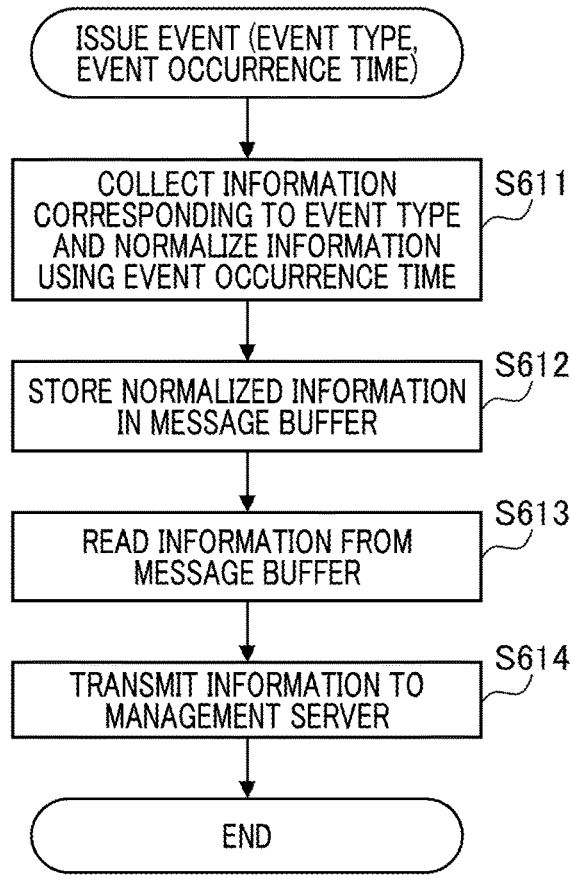

FIGS. 6A and 6B are flowcharts illustrating an event transmitting process for the management server 110 when various events occur inside the device 120. Each of the processes illustrated in FIGS. 6A and 6B is executed by the CPU 401 on the basis of a program stored in one storage unit of the RAM 403, the HDD 404, and the ROM 402.

Hereinafter, an error occurrence event will be described as an example of an event that has occurred inside the device 120. FIG. 6A is a flowchart illustrating the process of transmitting an error occurrence event to the management server 110. In Step S601, the event collecting unit 510 detects an occurrence of an event inside the device 120. In other words, the event collecting unit 510 functions also as an event detection unit. In this embodiment, the event collecting unit 510 detects an occurrence of an error, and the process proceeds to Step S602. In Step S602, the event collecting unit 510 acquires a current time as an event occurrence time, and the process proceeds to Step S603.

In Step S603, the event collecting unit 510 determines whether an event detected in Step S601 is a notification target event for the management server 110 in accordance with notification settings stored in the notification settings maintaining unit 521. More specifically, the event collecting unit 510 determines whether or not Collection "Alarm" corresponding to an event of an error is set as a notification target in the notification settings stored in the notification settings maintaining unit 521. In a case in which the event is a notification target, in other words, in a case in which Alarm is set as a notification target, the event collecting unit 510 causes the process to proceed to Step S604. On the other hand, in a case in which the event is not a notification target, this process ends.

In Step S604, the event collecting unit 510 performs an event issuing process. The event collecting unit 510 executes the event issuing process with the event detected in Step S601 of the event issuing process and a current time acquired in Step S604 as arguments, thereby transmitting the event to the management server 110. In this embodiment, the event collecting unit 510 executes the event issuing process on the basis of the event in which an error has occurred and the current time. Details of the event issuing process will be described with reference to FIG. 6B.

FIG. 6B is a flowchart illustrating the event issuing process.

In Step S611, the event collecting unit 510 performs a normalization process of the event and generates a message to be transmitted to the management server 110. More specifically, the event collecting unit 510 collects attribute information linked to the event type in advance from each module inside the device 120 in accordance with event details detected in advance. The attribute information is information assumed to be used in various services using information of an event in the management server 110 and is different for each event. For example, in the case of an event of an error occurrence, an error code, a name of a component in which the error has occurred, a count value notified until an error has occurred, and the like are attribute information that is a collection target. In addition, for example, in the case of an event of completion of a copy job, an execution user name, a distinction between color and monochrome, the number of sheets scanned, the number of prints, and the like are attribute information that is a collection target. The event collecting unit 510 performs normalization on the basis of the attribute information collected in accordance with the event and the time information acquired in Step S602 and generates a message acquired by assigning attribute information and the time information to the event. The normalization, for example, is executed in a general-purpose format such as the JSON.

In Step S612, the event collecting unit 510 stores the message generated in Step S612 in the message buffer 520. The message stored in the message buffer 520 (in other words, the normalized event) is only an event determined to be a notification target for the management server 110, and thus, details of the transmission to the management server 110 is determined at this time point.

In Step S613, the event transmitting unit 530 asynchronously detects writing of the message into the message buffer 520 in Step S612 and reads a message from the message buffer 520. In Step S614, the event transmitting unit 530 notifies the management server 110 of the message read in Step S613. In the notification process of Step S614, processes up to completion of transmission including an authentication operation for the management server 110, a retry process at the time of a communication error, and the like are executed. The management server 110 that has received the message from the device 120 stores the received event in the storage. As described above, events that are notification targets among various events that have occurred inside the device 120 are transmitted to the management server 110 and are collected therein.

Figure 7:
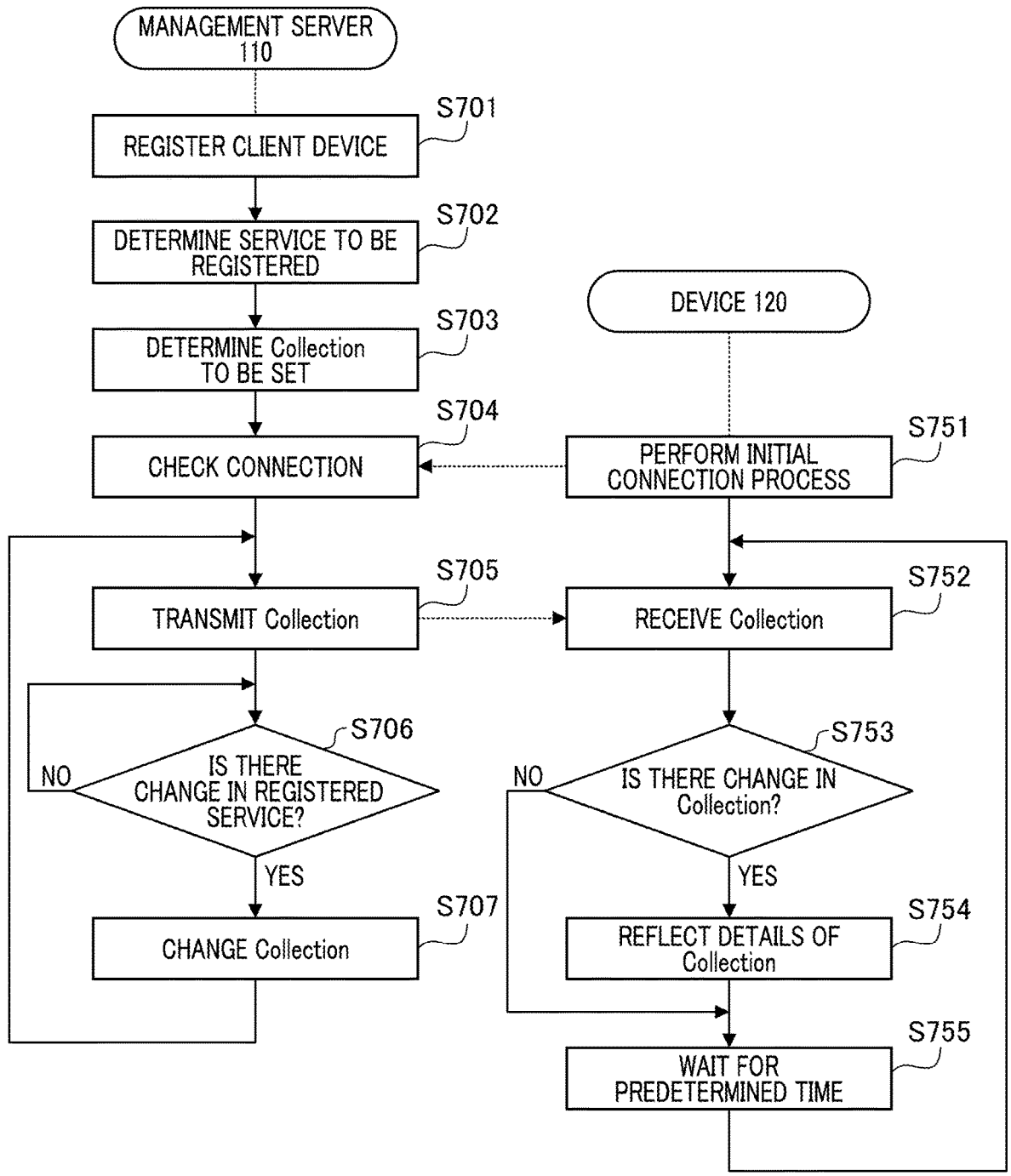
FIG. 7 is a flowchart illustrating a setting process of event notification settings.

FIG. 7 is a flowchart illustrating an event notification setting process. Each of the processes performed by the management server 110 is executed by the CPU 401 on the basis of a program stored in one storage unit of the RAM 203, the HDD 204, and the ROM 202. Each of processes performed by the device 120 is executed by the CPU 401 on the basis of a program stored in one storage unit of the RAM 403, the HDD 404, and the ROM 402.

In this process, the management server 110 and the device 120 that is a management target are connected, and an event notification setting is set in the notification settings maintaining unit 521 of the device 120. By updating a Collection file that is maintained by the notification settings maintaining unit 521 of the device 120, the event notification setting can be updated. Notification settings indicating whether or not to notify the management server 110 are entered in the Collection file in units of Collections.

The data collected on the management server 110 by the event transmitting process illustrated in FIGS. 6A and 6B is used for various services and application constructed on the management server 110. A service is contracted for each device 120, and data that is needed to be transmitted from the device 120 is different in accordance with the contracted service. For this reason, details written in Collection are different in accordance with the service. For example, in a case in which an operating status that is a macro such as a status operating in a dashboard or the like is desired to be monitored, Collections "Counter" and "Alarm" represented in Table 1 are set as notification targets. In addition, Information is set as a notification target in the case of an automatic delivery service of consumables, and Diagnosis is set as a notification target in the case of an operating monitoring maintenance service.

A flowchart 700 illustrated in FIG. 7 is a connection flow between an application of the management server 110 and the device 120, and an operating flow of the event transmitting unit 530 of the device 120 at that time is a flowchart 750.

In Step S701, the application of the management server 110 registers information of a client device to be connected together with a device serial number, customer information, and the like. In Step S702, the application of the management server 110 determines a service to be registered for use on the basis of contract details of a client. In Step S703, the application of the management server 110 determines details of Collection to be set in the device 120 in accordance with the service registered in Step S702.

In the device 120 that is a client device, in Step S751, the network communication unit 531 performs an initial connection process for the management server 110. More specifically, the network communication unit 531 performs network setting, performs communication through the network 100 in the process of inputting an address of the management server 110 and the like, and communicates with an application on the management server 110.

By receiving a connection process (Step S751) from the device 120, the management server 110 checks the connection of the device 120 in Step S704. When the connection is established, thereafter, data is exchanged between the device 120 that is a client and the management server 110.

In Step S705, the application of the management server 110 transmits the Collection determined in Step S703 to the device 120. In Step S752, the notification settings acquiring unit 532 of the device 120 receives the Collection transmitted from the management server 110.

In Step S753, the notification settings acquiring unit 532 of the device 120 determines whether or not there is a change in the received Collection from the Collection that has been already been maintained. In other words, it is determined whether or not there is a change in the notification setting of the event transmitted to the management server 110. In a case in which there is a change in the Collection, the process proceeds to Step S754. On the other hand, in a case in which there is no change in the Collection, the process proceeds to Step S755.

In Step S754, the notification settings acquiring unit 532 of the device 120 rewrites details of the Collection file stored in the notification settings maintaining unit 521 on the basis of the details received in Step S752. Thereafter, after waiting for a predetermined time in Step S755, the process returns to Step S752 again, and the operation of acquiring a latest Collection and applying it in the notification settings maintaining unit 521 as necessary is continued.

On the management server 110 side, in Step S706, it is determined whether or not there is a change in the details of the registered service due to a change in contract details of a customer or the like. In a case in which there is a change in the details of the registered service, the process proceeds to Step S707. On the other hand, in a case in which there is no change in the details of the registered service, the process of Step 706 is regularly repeated. In Step S707, the management server 110 changes the Collection such that it corresponds to the service in accordance with the details of the registered service that have been changed. Thereafter, in Step S705, the management server 110 communicates with the device 120 and performs a process of reflecting the latest Collection on the device 120.

As described above, in this embodiment, notification settings of an event managed by the device 120 are changed in accordance with service details that are under contract with a customer. After the notification settings are reflected, inside the device 120, every time the flows illustrated in FIGS. 6A and 6B are operated, an event occurring inside the device 120 (a state change) is notified to the management server 110 in accordance with the notification setting.

Next, a process in which the event collecting unit 510 writes a dependent event for one occurring event (also referred to as a main event) in the message buffer 520 will be described with reference to Table 2. Table 2 is a table representing a relation between an occurring event and a dependent event. A dependent event is notification information linked to a main event that is an occurring event detected by the event collecting unit 510. The dependent event may be transmitted to the management server 110 together with the main event, or only the dependent event may be transmitted to the management server 110.

TABLE 2

| Occurring event | Main event name | Main attribute | Dependent event name | Main attribute |
|---|---|---|---|---|
| Reach of life of toner | AlarmOccurred | Alarm code | LifePrediction ThresholdReached | Parts information, life information |
| Completion of replacement of toner bottle | AlarmOccurred | Alarm code | LifePrediction Initialized | Notification of initialization of life |
| | | | LifePrediction Discontinued | Final life information of parts before replacement |
| | | | TonnerBottle Installed | Part of new parts/counter information |
| | | | TonnerBottle Removed | Part of old part/counter information |
| Occurrence of Error | ErrorOccured | Error code | Diagnosis Completed | Diagnosis result of self-diagnosis |

As described with reference to FIG. 5, a state transition inside the device 120 is detected by the event collecting unit 510, and necessary information is collected and is written in the message buffer 520 in the form of an event. In a case in which the state transition detected by the event collecting unit 510 is a specific state transition defined inside the event collecting unit 510 in advance, a plurality of dependent events are written into the message buffer 520 with the same time information as that of the main event in accordance with Table 2.

For example, in the device 120 that is a multifunction device, a state in which a recording of an alarm code corresponding to ending of the lifespan is notified by the history settings maintaining unit 506 at a timing at which the toner becomes below a remaining amount set in advance is formed. At this time, the event collecting unit 510 detects event "AlarmOccurred" for notifying an occurrence of an alarm and writes the detected event in the message buffer 520. In addition, the event collecting unit 510 also writes event LifePredictionThredholdReached for notifying that the life of toner has reached a threshold with the same time information in accordance with Table 2. The event LifePredictionThredholdReached is a dependent event accompanying the event AlarmOccurred. In this way, a status in which an alarm has occurred inside the device 120 and a status in which the remaining amount of toner has reached the threshold as details thereof can be notified to the management server 110 as different events.

In addition, when a user or a serviceman completes a toner bottle replacement operation for the device 120 that is a multifunction device, a state in which the history settings maintaining unit 506 notifies recording of an alarm code corresponding to the completion of replacement of the part is formed. At this time, the event collecting unit 510 detects the event AlarmOccurred for notifying an occurrence of an alarm and writes the detected event in the message buffer 520. In addition, the event collecting unit 510 also writes the same time information for four dependent events such as event LifePredictionInitialized and the like in accordance with Table 2. The event LifePredictionInitialized is a notification of initialization of life information, and the event LifePredictionDiscontinued is a notification of final life information of the replacing toner bottle. In addition, event TonnerBottleInstalled is an event of detection of a new tonner bottle, and event TonnerBottleRemoved is an event of detection of detachment of an old toner bottle.

In this way, by defining a plurality of pieces of notification information linked to one occurring event as different events having different meanings, assigning different attributes thereto, and notifying of the events, information can be easily searched and used by the management server 110.

Figure 8:
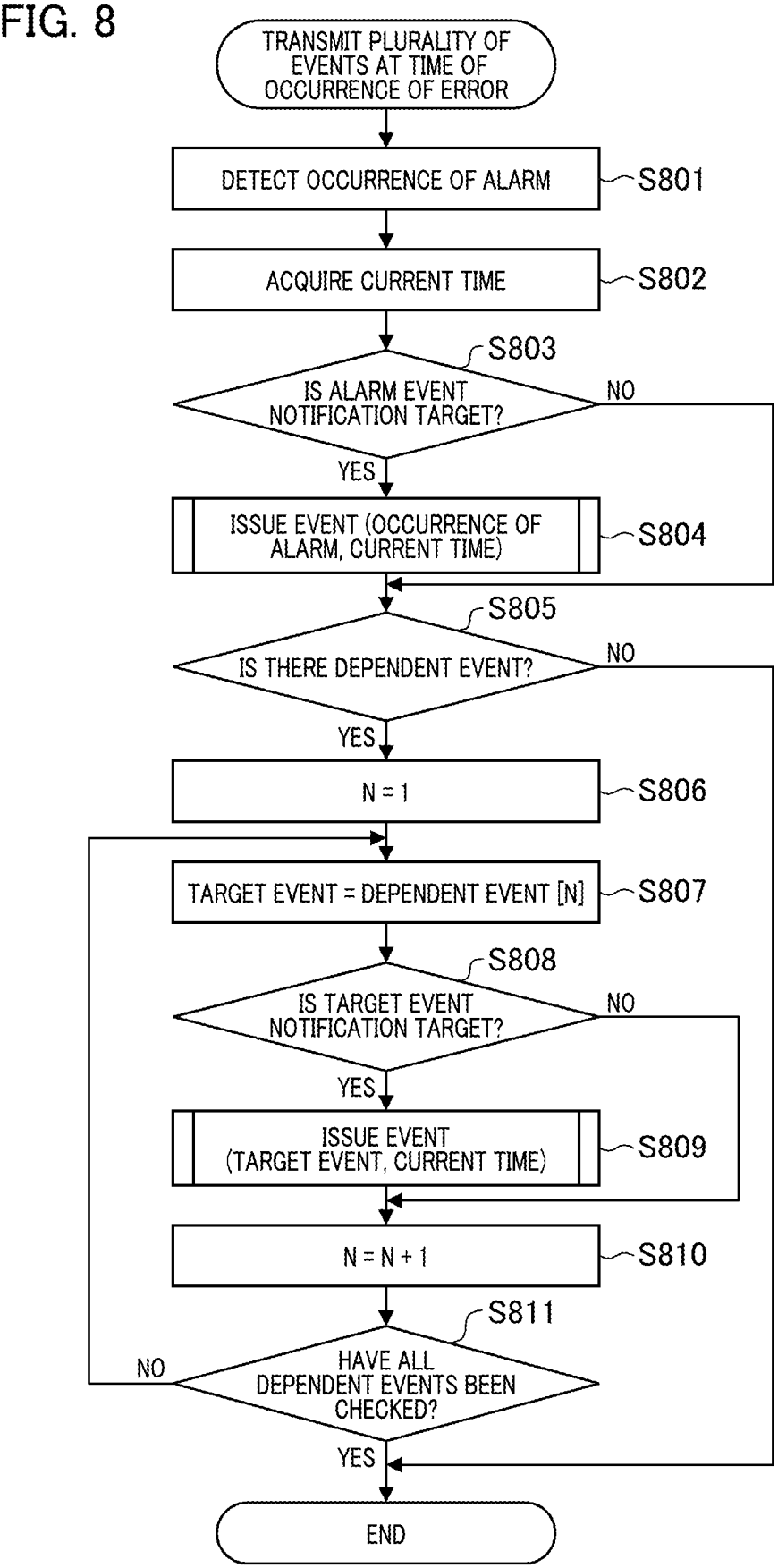
FIG. 8 is a flowchart illustrating an event transmitting process in a case in which a dependent event is present.

FIG. 8 is a flowchart representing an event transmitting process in a case in which there are dependent events for one occurring event (main event). Each of processes illustrated in FIG. 8 is stored in one storage unit of the RAM 403, the HDD 404, and the ROM 402 and is executed by the CPU 401.

In Step S801, the event collecting unit 510 detects a state change (an occurrence of an event) of the device 120. Hereinafter, as one example, a case in which the event collecting unit 510 detects an alarm (event AlarmOccurred) of completion of replacement of the toner bottle will be described. In Step S802, the event collecting unit 510 acquires current time information. Hereinafter, the event detected by the event collecting unit 510 will be also referred to as a main event.

In Step S803, the event collecting unit 510 determines whether or not the event (main event) detected in Step S801 is a notification target event for the management server 110 in accordance with the notification settings stored in the notification settings maintaining unit 521. More specifically, the event collecting unit 510 determines whether or not Alarm that is a Collection corresponding to the event AlarmOccurred is set as a notification target in the notification settings stored in the notification settings maintaining unit 521. In a case in which the event is a notification target, in other words, in a case in which Alarm is set as a notification target, the event collecting unit 510 causes the process to proceed to Step S804. On the other hand, in a case in which the event is not a notification target, an event is not issued, and the process proceeds to Step S805.

In Step S804, the event collecting unit 510 calls a subroutine (FIG. 6B) of event issuance and transmits an alarm occurrence event to the management server 110, and the process proceeds to Step S805.

In Step S805, the event collecting unit 510 determines whether or not there is a dependent event to be notified accompanying the event detected in Step S801 (event AlarmOccurred). More specifically, the process is realized in a form in which the event collecting unit 510 realizes a logic as in Table 2 using a program or defines the logic as a table and reads the table. In a case in which there is a dependent event, the process proceeds to Step S806. On the other hand, in a case in which there is no dependent event, the process ends.

In Step S806, the event collecting unit 510 sets N=1. Here, N is the number of dependent events executing the event transmitting process. In a case in which there are a plurality of dependent events, Steps S807 to S811 are repeated in correspondence with the number of events to be transmitted as dependent events, and it is determined whether or not each dependent event is to be notified to the management server 110. Steps S806 and S810 are a process for repetition.

In Step S807, the event collecting unit 510 determines a dependent event that is a target to be determined as being a notification target or not among dependent events. In Step S808, the event collecting unit 510 determines whether the dependent event determined as the target event in Step S807 is a notification target event for the management server 110 in accordance with the notification settings stored in the notification settings maintaining unit 521. More specifically, the event collecting unit 510 determines whether or not a Collection corresponding to the dependent event is set as a notification target in the notification settings stored in the notification settings maintaining unit 521. In a case in which the dependent event is a notification target, the event collecting unit 510 causes the process to proceed to Step S809. On the other hand, in a case in which the dependent event is not a notification target, an event is not issued, and the process proceeds to Step S810.

In Step S809, the event collecting unit 510 calls a subroutine (FIG. 6B) of event issuance and transmits one or more dependent events to the management server 110, and the process proceeds to Step S810. In a case in which a main event has been issued in the subroutine (FIG. 6B) of event issuance called by the dependent event, identification information that can be used for identifying the main event such as a unique ID assigned to the main event is added to the dependent event as one of pieces of attribute information of Step S611. In this way, a relating event can be tracked by the management server 110 side.

In addition, there is a case in which only a dependent event is notified without notifying of the main event (in a case in which No in Step S803 and Yes in Step S808). For example, when the toner bottle is replaced, there is a case in which the event AlarmOccurred for notifying of an occurrence of an alarm is not notified, and only a dependent event representing a specific event such as replacement of the toner bottle is notified. As a specific event representing replacement of the toner bottle, there is event TonnerBottleInstalled (a new toner bottle detection event) or the like. In a case in which Alarm of Collection is not a notification target, and Information is a notification target in the notification setting, event AlarmOccurred is not notified, and event TonnerBottleInstalled is notified. By notifying of only a dependent event without notifying of a main event, only information that is necessary for the management server 110 can be notified. In a case in which only a dependent event is notified, the management server 110 side does not need to manage the main event and the dependent event with linked to each other, and thus, identification information of the main event does not need to be added to the attribute information of the dependent event.

In Step S810, the event collecting unit 510 adds "1" to N. In Step S811, the event collecting unit 510 determines whether or not the determination of being a notification target or not has been completed for all the dependent events. More specifically, in a case in which N is larger than the number of all the dependent events, it is determined that the determination has been completed for all the dependent events. In a case in which the determination has been completed for all the dependent events, this process ends. On the other hand, in a case in which the determination has not been completed for all the dependent events, the process is returned to Step S807.

As described above, according to this embodiment, detailed information from which various services on the management server 110 can be easily analyzed and interpreted can be transmitted from the device 120 to the management server 110. In addition, since only necessary information is selected and transmitted, the amount of communication data and the processing loads on the device 120 and the management server 110 can be reduced.

OTHER EMBODIMENTS

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-172001, filed Sep. 20, 2019, which is hereby incorporated by reference wherein in its entirety.

What is claimed is:

1. A network device including a detection unit that detects an event, the network device comprising:
a memory storing instructions; and
a processor executing the instructions causing the network device to:
manage notification settings;
generate, in a case where the event detected by the detection unit is determined as a notification target in accordance with the notification settings, a message for the event;
determine whether or not each of details of notification information is a notification target in accordance with the notification settings in a case in which the notification information linked to the event detected by the detection unit is present;
generate messages for the respective details that are determined as the notification targets, wherein attribute information linked to the detail or the event is respectively assigned to the generated messages; and
transmit the generated messages to a management server,
wherein the attribute information includes information that can be used for uniquely identifying the event, and
wherein, in a case where the event is determined not to be the notification target and the generated messages are messages only for derivative details of the notification information linked to the detected event, the attribute information respectively assigned to the generated messages does not include the information that can be used for uniquely identifying the event.

2. The network device according to claim 1, wherein, in a case in which the event is determined not to be the notification target, no message is generated for the event.

3. The network device according to claim 1, wherein the notification settings are updated in accordance with a change in a service used by the management server.

4. The network device according to claim 1, wherein being a notification target or not is managed for each group of one or more events or the details of the notification information in the notification settings.

5. The network device according to claim 4, wherein the notification settings are updated in a case in which there is a change in the group that is the notification target in accordance with a change in a service used by the management server.

6. A method of controlling a network device including a detection unit that detects an event, the method comprising:
managing notification settings;
generating, in a case where the event detected by the detection unit is determined as a notification target in accordance with the notification settings, a message for the event;

determining whether or not each of details of notification information is a notification target in accordance with the notification settings in a case in which notification information linked to an event detected by the detection unit is present;

generating messages for the respective details that are determined as the notification targets, wherein attribute information linked to the detail or the event is respectively assigned to the generated messages; and transmitting the generated messages to a management server, wherein, the attribute information includes information that can be used for uniquely identifying the event, and wherein, in a case where the event is determined not to be the notification target and the generated messages are messages only for derivative details of the notification information linked to the detected event, the attribute information respectively assigned to the generated messages does not include the information that can be used for uniquely identifying the event.

7. A non-transitory storage medium on which is stored a computer program for making a computer of a network device execute:

managing notification settings;

generating, in a case where the event detected by the detection unit is determined as a notification target in accordance with the notification settings, a message for the event;

determining whether or not each of details of notification information is a notification target in accordance with the notification settings in a case in which notification information linked to an event detected by the detection unit is present;

generating messages for the respective details that are determined as the notification targets, wherein attribute information linked to the detail or the event is respectively assigned to the generated messages; and transmitting the generated messages to a management server, wherein, the attribute information includes information that can be used for uniquely identifying the event, and wherein, in a case where the event is determined not to be the notification target and the generated messages are messages only for derivative details of the notification information linked to the detected event, the attribute information respectively assigned to the generated messages does not include the information that can be used for uniquely identifying the event.

* * * * *